United States Patent [19]

Kanazawa et al.

[11] Patent Number: 5,044,454
[45] Date of Patent: Sep. 3, 1991

[54] REAR WHEEL STEERING DEVICE FOR A VEHICLE

[75] Inventors: Hirokata Kanazawa; Hiroshi Ohmura, both of Hiroshima, Japan

[73] Assignee: Mazda Motor Corporation, Hiroshima, Japan

[21] Appl. No.: 589,784

[22] Filed: Sep. 26, 1990

[30] Foreign Application Priority Data

Sep. 27, 1989 [JP] Japan .................................. 1-253087

[51] Int. Cl.$^5$ .......................... B62D 5/06; B62D 7/06
[52] U.S. Cl. .................................. 180/79.1; 180/142; 280/91; 192/48.2
[58] Field of Search .............. 180/140, 142, 149, 154, 180/79.1; 280/91; 192/84 C, 48.2

[56] References Cited

U.S. PATENT DOCUMENTS

| 4,825,988 | 5/1989 | Nishimura | 192/48.2 X |
| 4,856,606 | 8/1989 | Brown | 280/91 X |
| 4,875,565 | 10/1989 | Depoli | 192/48.2 |
| 4,930,592 | 6/1990 | Ohmura | 180/140 X |
| 4,953,648 | 9/1990 | Ohmura | 180/140 X |
| 4,976,328 | 12/1990 | Ohmura | 180/79.1 X |

FOREIGN PATENT DOCUMENTS

| 160967 | 7/1987 | Japan | 280/91 |
| 90479 | 4/1988 | Japan | 180/140 |

Primary Examiner—Charles A. Marmor
Assistant Examiner—Kevin Hurley
Attorney, Agent, or Firm—Sixbey, Friedman, Leedom & Ferguson

[57] ABSTRACT

The rear wheel steering device for a vehicle includes a rear wheel steering shaft for interconnecting left and right rear wheels and a transmission mechanism for transmitting an output from the electric motor to the rear wheel steering shaft through a clutch. Further, a stopper member is disposed between the electric motor and the clutch of the transmission mechanism to restrict a relative displacement of constituent members of the transmission mechanism, and thereby preventing an excessive rotation of the electric motor exceeding a fixed level. With the arrangement, an uncontrollable rotation of the electric motor can be reliably prevented and an disengagement operation of the clutch can be carried out without any trouble.

8 Claims, 4 Drawing Sheets

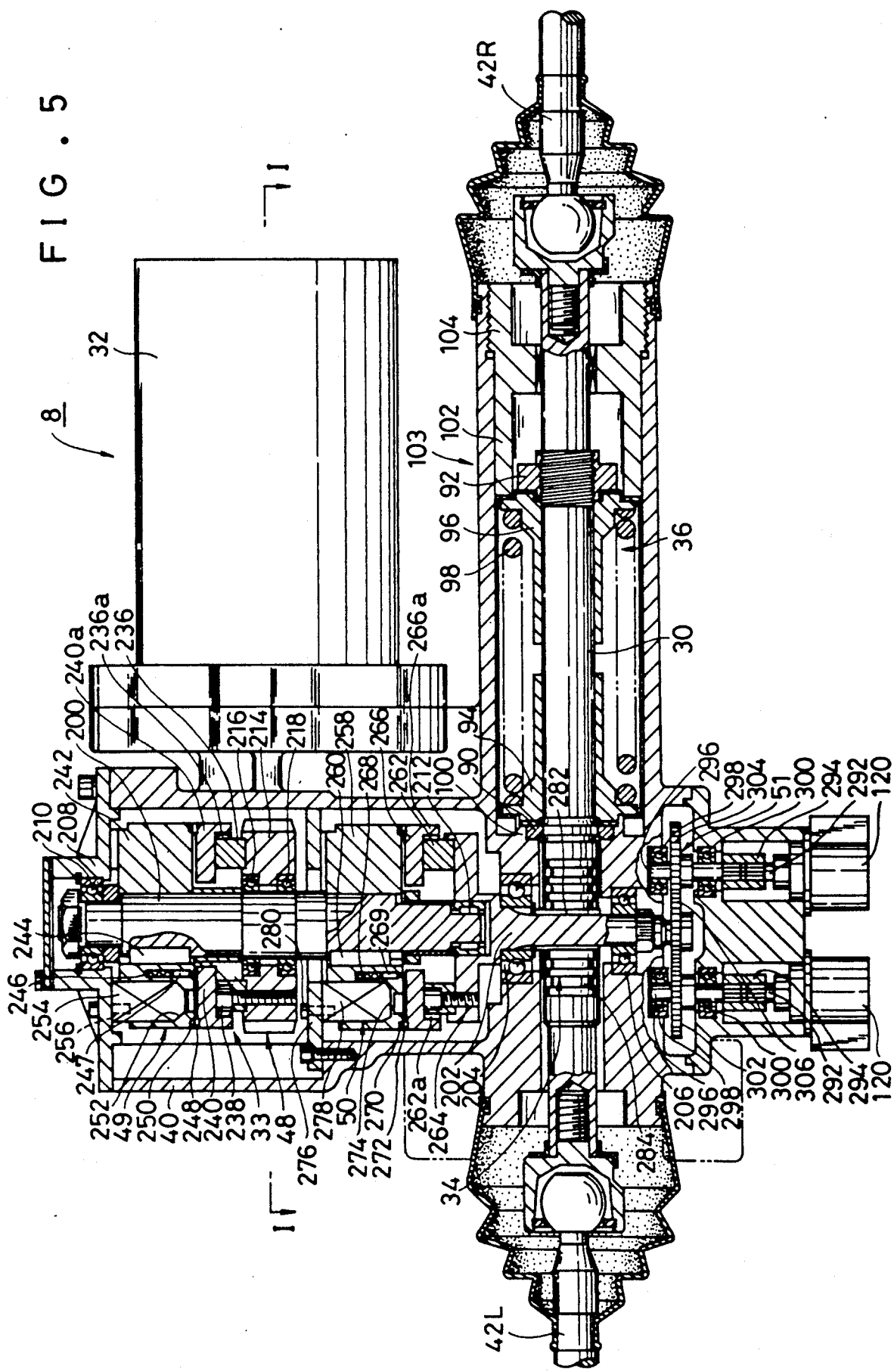

REAR WHEEL STEERING DEVICE FOR A VEHICLE

BACKGROUND OF THE INVENTION

1. Field of the Invention

The present invention relates to a rear wheel steering device for a vehicle which steers rear wheels in relation to a steering control for front wheels.

2. Description of the Prior Art

A conventional rear wheel steering device for a vehicle generally comprises: a rear wheel steering shaft extending in the widthwise direction of the vehicle body to be interconnected, at both ends thereof, with left and right rear wheels by means of tie rods respectively; an electric motor as a power source; and a transmission mechanism for transmitting an output from the electric motor to the rear wheel steering shaft. With this construction, the conventional rear wheel steering device for a vehicle steers the rear wheels, at low speeds, in the opposite phase to the front wheels to achieve higher turning performance, while, at high speeds, steers the rear wheels in the same phase as the front wheels to obtain higher running stability. One example of the conventional rear wheel steering device is disclosed in Japanese Patent Application Laying-open Gazettes No. 60-193771 and No. 62-25277.

To prevent failures, this type of a rear wheel steering device is provided with a clutch in the transmission mechanism and also centering spring means for pressing the rear wheel steering shaft to a neutral position. Accordingly, in case of failure, this clutch interrupts the transmission of the output from the electric motor to the rear wheel steering shaft through the transmission mechanism. At the same time, the centering spring means presses and holds the rear wheel steering shaft and the left and right rear wheels interconnected therewith in the neutral position.

However, when rotation of the electric motor exceeds the normal rotation range, in other words, in case of uncontrollable rotation of the electric motor, the rear wheels may be abnormally steered before the clutch is disengaged. The uncontrollable rotation of the electric motor is stopped when the rear wheel steering shaft is brought to interfere with other constituent members (for example, a supporting member for supporting the rear wheel steering shaft, etc.) and thus the axial displacement (displacement in the widthwise direction of the vehicle body) of the rear wheel steering shaft is restricted. However, this may cause a load to act on the clutch and may hinder the disengagement operation thereof.

SUMMARY OF THE INVENTION

An object of the present invention is to provide a rear wheel steering device for a vehicle wherein a preventive measure against an uncontrollable rotation of an electric motor is taken to improve running stability of the vehicle.

A rear wheel steering device for a vehicle in this invention must be first defined as follows. The rear wheel steering device for a vehicle includes: a rear wheel steering shaft for interconnecting left and right rear wheels; an electric motor; a transmission mechanism for transmitting an output from the electric motor to the rear wheel steering shaft; and wherein the transmission mechanism is provided with a clutch to interrupt an output transmission from the electric motor to the rear wheel steering shaft. To achieve the abovementioned object, the rear wheel steering device is further provided with a stopper member disposed between the electric motor and the clutch of the transmission mechanism. This stopper member restricts a relative displacement of constituent members of the transmission mechanism to prevent an excessive rotation of the electric motor exceeding a fixed level.

With this arrangement, the uncontrollable rotation of electric motor can be prevented since the stopper member provided between the electric motor and the clutch of the transmission mechanism restricts the relative displacement of the constituent members of the transmission mechanism. Accordingly, an abnormal steering of the rear wheels can be reliably prevented.

In addition, under the state where the uncontrollable rotation of the electric motor is being prevented by the stopper member, the clutch is not subject to a load generated upon preventing the rotation since the clutch is located on a downstream side of the stopper member in the power transmission channel. Accordingly, the clutch can be smoothly disengaged.

The above and other objects, features and advantages of the present invention will be understood more clearly by reading the following description of preferred embodiments, with reference to the accompanying drawings.

BRIEF DESCRIPTION OF THE DRAWINGS

The attached drawings show preferred embodiments of the present invention, in which:

FIG. 5 is a plan view, partly broken away to show a main part of a rear wheel steering device.

DETAILED DESCRIPTION OF THE INVENTION

Preferred embodiments of the present invention are now described with reference to the accompanying drawings.

Figure 2:
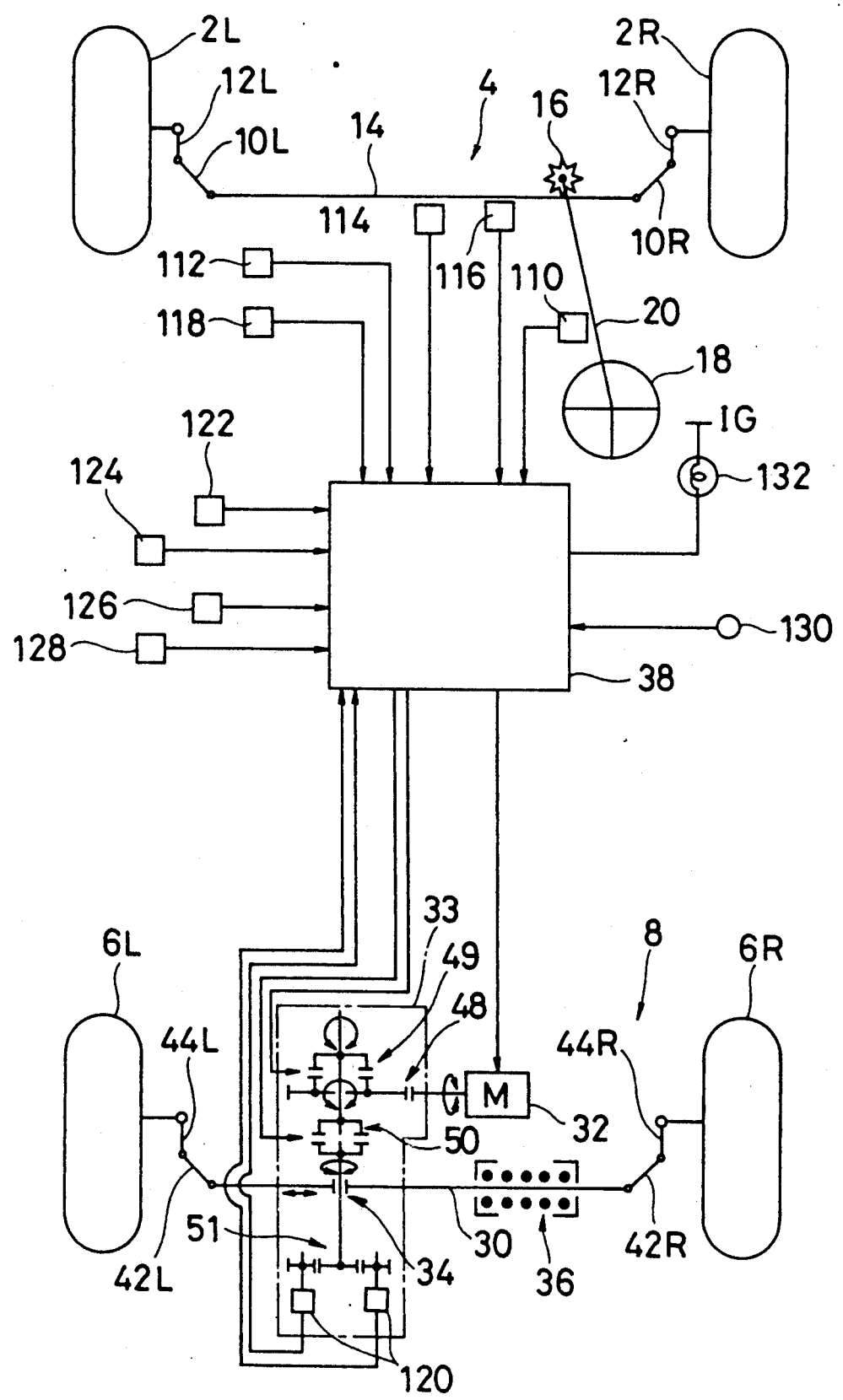
FIG. 2 is a schematic drawing showing an overall construction of a steering system for a vehicle.

FIG. 2 shows an overall construction of a steering system for a vehicle provided with a rear wheel steering device in accordance with a first embodiment of the present invention. This steering system for a vehicle comprises: a front wheel steering device 4 for steering left and right front wheels 2L, 2R; and a rear wheel steering device 8 for steering left and right rear wheels 6L, 6R.

The front wheel steering device 4 comprises: a front wheel steering shaft 14 extending in the widthwise direction of the vehicle body to be interconnected, at both ends thereof, with a pair of the left and right front wheels 2L, 2R by means of a pair of left and right tie rods 10L, 10R and knuckle arms 12L, 12R; and a steering shaft 20 having, at one end thereof, a pinion 16 which engages with a rack teeth (not shown in the drawings) formed on the front wheel steering shaft 14, and at the other end thereof, a steering wheel 18. With this construction, the front wheel steering shaft 14 displaces in the widthwise direction of the vehicle body in response to a handling maneuver of the steering wheel 18, and thereby steering the front wheels 2L, 2R.

Meanwhile, the rear wheel steering device 8 comprises: a rear wheel steering shaft 30 for interconnecting left and right rear wheels 6L, 6R; centering spring means 36 for pressing the rear wheel steering shaft 30 to a neutral position; a servomotor 32 as an electric motor for steering the rear wheel steering shaft 30 against the pressing force by the centering spring means 36; and a transmission mechanism 33 for transmitting an output from the servomotor 32 to the rear wheel steering shaft 30.

The rear wheel steering shaft 30 extends in the widthwise direction of the vehicle body, and is interconnected, at both ends thereof, with the left and right rear wheels 6L, 6R by means of tie rods 42L, 42R and knuckle arms 44L, 44R. Thus, the rear wheels 6L, 6R are steered by the stroke-displacement of the rear wheel steering shaft 30 in the widthwise direction (axial direction) of the vehicle body.

The transmission mechanism 33 includes: a worm gearing mechanism 48 provided in an output shaft of the servomotor 32; a rack and pinion mechanism 34 provided in the rear wheel steering shaft 30; and two clutch mechanisms 49, 50 interposed between the worm gearing mechanism 48 and the rack and pinion mechanism 34 so as to interrupt an output transmission from the output shaft of the servomotor 32 to the rear wheel steering shaft 30.

The servomotor 32 and the two clutch mechanisms 49, 50 of the transmission mechanism 33 are controlled by a controller 38 as control means. Under the control of this controller 38, when the rear wheels 6L, 6R are not steered (when an engine is being stopped while an ignition switch is in an OFF state), the clutch mechanisms 49, 50 are both disengaged, and as a result, the rear wheel steering shaft 30 and the rear wheels 6L, 6R interconnected therewith are held in the neutral position by the centering spring means 36. In contrast, when the rear wheels 6L, 6R are steered (when the engine is being driven while the ignition switch is in an ON state), the two clutch mechanisms 49, 50 are both engaged. As a result, the servomotor 32 is brought into rotation when the front wheels 2L, 2R are steered by the operation of the steering wheel 18. Then, the rotation of the servomotor 32 is transmitted to the rear wheel steering shaft 30 by means of the worm gearing mechanism 48, the clutch mechanisms 49, 50 and the rack and pinion mechanism 34. This means that the rear wheel steering shaft 30 undergoes a stroke-displacement against the pressing force by the centering spring means 36. Consequently, the rear wheels 6L, 6R interconnected with the rear wheel steering shaft 30 are steered at a desired angle.

An output from the clutch mechanism 50 is transmitted to two rear wheel steering angle sensors 120, 120 by means of a gear mechanism 51. Then, rear wheel steering angle signals detected by these sensors 120, 120 are inputted into the controller 38. In response to this rear wheel steering angle signal, the controller 38 controls the servomotor 32 and the two clutch mechanisms 49, 50 of the transmission mechanism 33 in order to properly steer the rear wheels 6L, 6R at a desired angle. The rear wheel steering sensors 120, 120, are provided in a pair, and thus contributing to improve the control reliability.

Signals from various sensors are inputted to the controller 38 in order to carry out the rear wheel steering control properly. Reference numeral 110 designates a steering wheel steering angle sensor for detecting a steering wheel steering angle, and 116 designates a front wheel steering angle sensor for detecting a front wheel steering angle based on a stroke displacement angle of the front wheel steering shaft 14. Reference numerals 112, 118 are vehicle speed sensors for detecting a vehicle speed. 114 is a yaw rate sensor for detecting a yaw rate of the vehicle body. 122 is a neutral clutch switch for detecting a N (neutral) position of an automatic transmission gear and also the pedalling of the clutch. 124 is an inhibitor switch for detecting the neutral position and a P (parking) position of the automatic transmission gear. 126 is a brake switch for detecting an application of a brake. 128 is an engine switch for detecting an engine operating state. 130 is a L terminal for an alternator.

Figure 3:
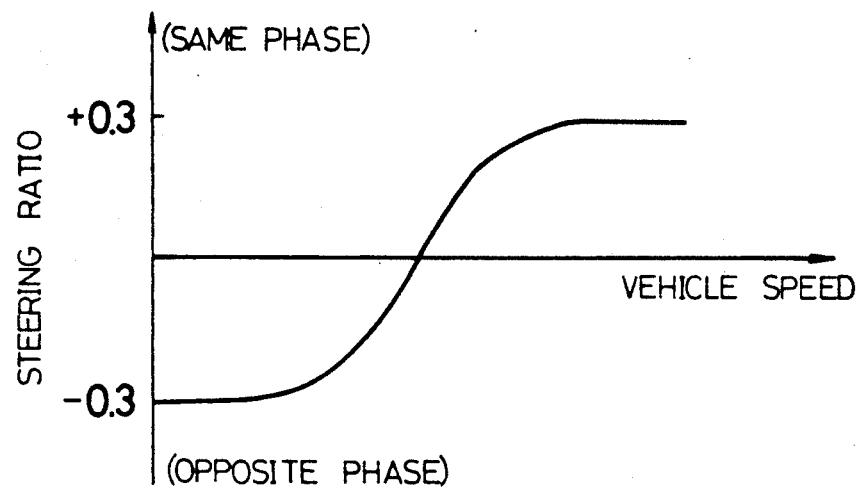
FIGS. 3 and 4 are characteristic diagrams of a rear wheel steering.
Figure 4:
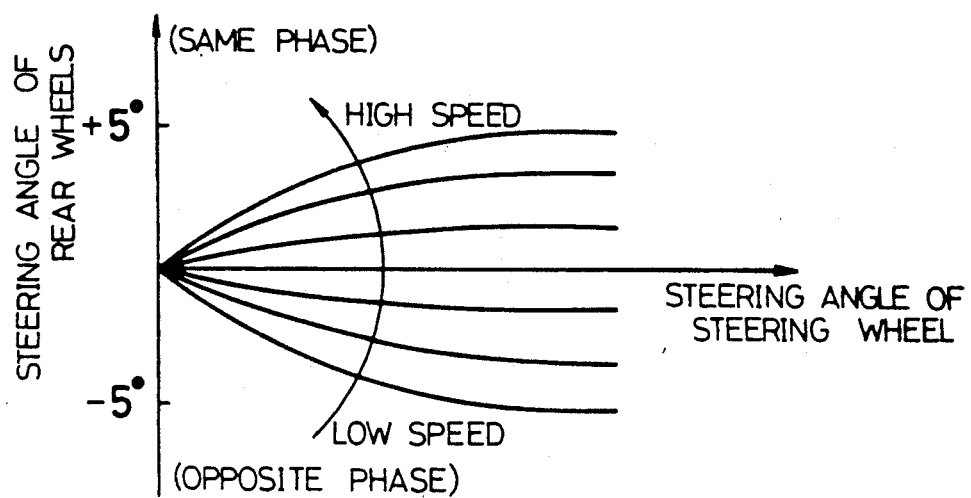

The rear wheel steering control by the controller 38 is conducted in response to a vehicle speed. An example of a change in a steering ratio (a ratio of a rear wheel steering angle to a front wheel steering angle) in accordance with a vehicle speed is shown in FIG. 3. Under the condition of the control characteristics shown in FIG. 3, a ratio of a rear wheel steering angle to a front wheel steering angle changes to the direction of the same phase along with an increase in a vehicle speed. This change is also illustrated in FIG. 4. Reference numeral 132 in FIG. 2 denotes a warning lamp connected to the controller 38.

Figure 1:
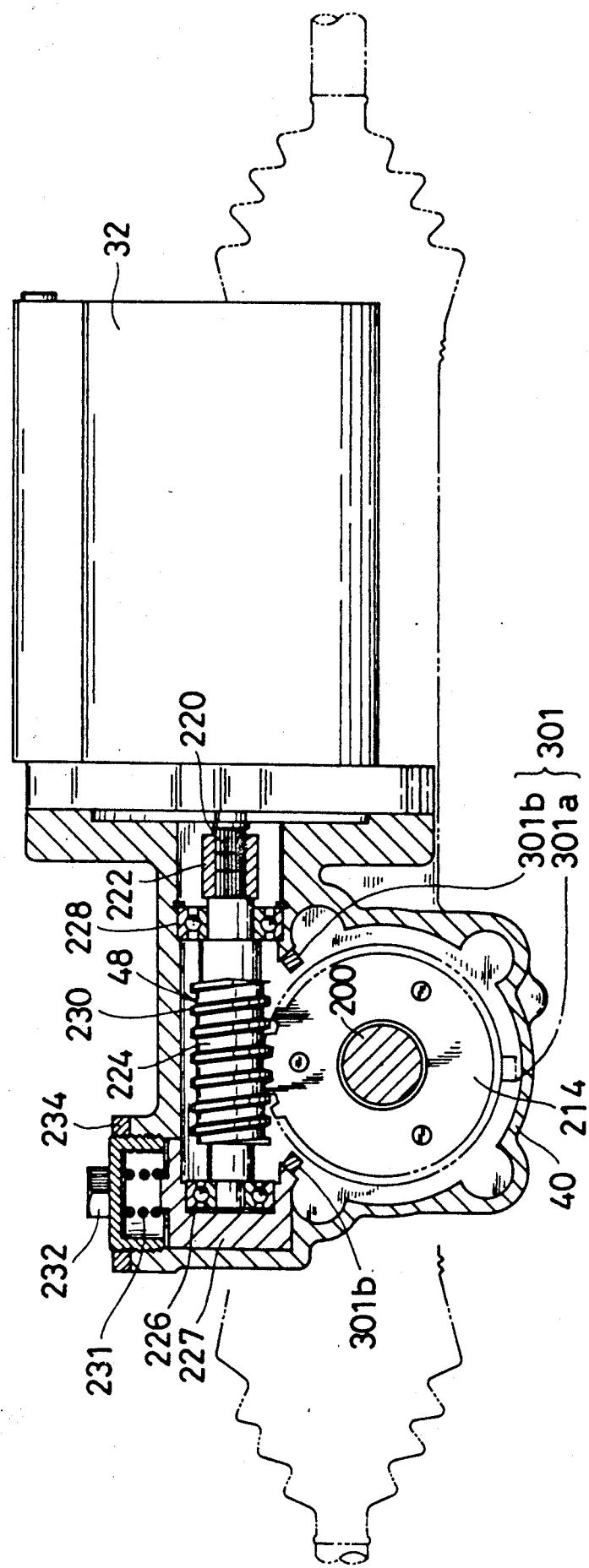
FIG. 1 is a sectional view taken on line I—I of FIG. 5.

Referring now to FIGS. 1 and 5, the construction of the rear wheel steering device 8 is described in detail.

In FIGS. 1 and 5, reference numeral 32 designates the servomotor of the rear wheel steering device. The servomotor 32 is disposed in such a way that an output shaft 220 thereof extends in the widthwise direction of the vehicle body. Connected to this servomotor 32 is a housing 40 in which the rear wheel steering shaft 30, the centering spring means 36 and the transmission mechanism 33 of the rear wheel steering device 8 are accommodated.

First, the rear wheel steering shaft 30 and the centering spring means 36 are discussed.

The rear wheel steering shaft 30 is slidably supported inside the housing 40. This rear wheel steering shaft 30 has a pair of left and right stoppers 90, 92 which are axially spaced apart at a fixed interval. Inserted between these stoppers 90, 92 to be fitted to the rear wheel steering shaft 30 are a pair of spring seats 94, 96. These spring seats 94, 96 are restricted in its movement in an opening direction thereof by the stoppers 90, 92. Provided in a compressed state between the spring seats 94, 96 is a centering spring 98 for pressing the rear wheel steering shaft 30 to the neutral position.

Locking portions 100, 102 are formed inside the housing 40 corresponding to the stoppers 90, 92. These locking portions 100, 102 restrict a movement of the stoppers 90, 92 in the opening direction thereof. These locking portions 100, 102 and the stoppers 90, 92 constitute restricting means 103 for restricting an axial stroke displacement of the rear wheel steering shaft 30 exceeding a fixed level. The locking portion 102 forms a spring cover member 104 screwed into the housing 40. An axial directional position of the locking portion 102 is varied by adjusting an extent of how much the spring cover member 104 is screwed into the housing 40. Consequently, a compression load (pre-set load) of the centering spring 98 can be set properly when an adjustment is required. According to this pre-set load, the rear wheel steering shaft 30 is pressed into the neutral position. This pre-set load must be large enough to overcome a side force produced upon cornering.

Next, the transmission mechanism 33 is described.

As described earlier, the transmission mechanism 33 includes: the worm gearing mechanism 48 provided in the output shaft 220 of the servomotor 32; the rack and pinion mechanism 34 provided in the rear wheel steering shaft 30; and two clutch mechanisms 49, 50 interposed between the worm gearing mechanism 48 and the rack and pinion mechanism 34 so as to interrupt an output transmission from the output shaft 220 of the servomotor 32 to the rear wheel steering shaft 30. The worm gearing mechanism 48, the rack and pinion mechanism 34 and the two clutch mechanisms 49, 50 are all accommodated inside the housing 40.

The transmission mechanism 33 is provided with two shafts 200, 202. These shafts 200, 202 are disposed, inside the housing 40, coaxially on an axis in the longitudinal direction of the vehicle body and rotatably arranged respectively. The shaft 202 is pivotably supported by bearing portions 204, 206 of the housing 40. Meanwhile, the shaft 200 is pivotably supported, at one end thereof (a front end), by a bearing portion 210 of a cover plate 208 of the housing 40, and also pivotably supported, at the other end thereof (a rear end), by a bearing portion 212 formed at one end (a front end) of the shaft 202. Arranged on the shafts 200, 202 are, from the front, the first clutch mechanism 49, the worm gearing mechanism 48, the second clutch mechanism 50, the rack and pinion mechanism 34 and the gear mechanism 51. These mechanisms are described in detail in the following part.

First comes the description of the worm gearing mechanism 48.

A worm wheel 214 is rotatably fitted to the shaft 200. In other words, this worm wheel 214 is pivotably supported by the shaft 200 by means of bearing portions 216, 218. In contrast, the output shaft 220 of the servomotor 32 is connected with an output shaft 224 by means of a spline connecting ring 222 as shown in FIG. 1. This output shaft 224 is, in turn, pivotally supported by bearing portions 226, 228 of the housing 40. A worm 230 is provided on this output shaft 224 between the bearing portions 226, 228. This worm 230 of the output shaft 224 engages with the worm wheel 214. Accordingly, the rotation of the output shaft 220 of the servomotor 32 causes the worm wheel 214 to rotate.

The spline connecting ring 222 corrects any positional slippage in the axial direction between the output shaft 220 of the servomotor 32 and the output shaft 224. The bearing portion 226 is retained by a retainer body 227. This retainer body 227 is disposed inside the housing 40. The retainer body 227 is connected with an adjustment member 232 by means of a spring 231. This adjustment member 232 is screwed into a cover member 234 of the housing 40. An engagement relation of the worm 230 of the output shaft 224 with the worm wheel 214 can be adjusted depending upon how much the adjustment member 232 is screwed into the cover member 234.

Next comes the description of the first clutch mechanism 49.

A ring body 236 is fixed on the worm wheel 214 by a bolt 238. This ring body 236 has a spline portion 236a on an outer periphery surface thereof. Another ring body 240 is disposed coaxially with this ring body 236. The ring body 240 has a spline portion 240a on an inner periphery surface thereof. The spline portion 240a engages with the spline portion 236a of the ring body 236. Consequently, the ring body 240 is axially movable in relation to the ring body 236, and is rotatable along with the rotation of the ring body 236.

A clutch body 242 is fixed to the shaft 200 by a fixing segment 244. Thus, the shaft 200 rotates along with the rotation of this clutch body 242. The clutch body 242 has a spring 246 and a contactor 247 therein. The spring 246 presses the ring body 240 away from the clutch body 242. Thus, the rotation of the ring body 240 is not transmitted to the clutch body 242. A projected portion 248 is formed on the ring body 240 at a contact surface between the ring body 240 and the clutch body 242. Corresponding to this projected portion 248, a recessed portion 250 is formed on the clutch body 242. When the projected portion 248 of the ring body 240 engages with the recessed portion 250 of the clutch body 242, the rotation of the ring body 240 is transmitted to the clutch body 242.

On the clutch body 242, a ring-shaped recessed portion 252 is formed on a surface opposite to the recessed portion 250. A solenoid 254 is fixed on the cover plate 208 of the housing 40 by a bolt 256. The solenoid 254 is spaced inside the ring-shaped recessed portion 252 of the clutch body 242. When the solenoid 254 is excited, the ring body 240 is attracted to the clutch body 242 against the spring 246. As a result, the projected portion 248 of the ring body 240 engages with the recessed portion 250 of the clutch body 242. This transmits the rotation of the ring body 240 to the clutch body 242, thereby rotating the clutch body 242.

Next, the second clutch mechanism 50 is described.

A clutch body 258 is fixed to the shaft 200 by a fixing segment 260. Thus, this clutch body 258 rotates along with the rotation of the shaft 200. Meanwhile, a ring body 262 is fixed on the shaft 202 by a bolt 264. This ring body 262 has a spline portion 262a on an outer periphery surface thereof. Another ring body 266 is disposed coaxially with this ring body 262. This ring body 266 has a spline portion 266a on an inner periphery surface thereof. The spline portion 266a engages with the spline portion 262a of the ring body 262. Consequently, the ring body 266 is axially movable in relation to the ring body 262, and is rotatable along with the rotation of the ring body 266.

The clutch body 258 has a spring 268 and a contactor 269 therein. The spring 268 presses the ring body 266 away from the clutch body 258. Thus, the rotation of the clutch body 258 is not transmitted to the ring body 266. A recessed portion 270 is formed on the clutch body 258 at a contact surface between the clutch body 258 and the ring body 266. Corresponding to this recessed portion 270, a projected portion 272 is formed on the clutch body 266. When the engagement relation is formed between the recessed portion 270 of the clutch body 258 and the projected portion 272 of the ring body 266, the rotation of the clutch body 258 is transmitted to the ring body 266.

On the clutch body 258, a ring-shaped recessed portion 274 is formed on a surface opposite to the recessed portion 270. A solenoid 278 is fixed on a retainer member 276 of the housing 40 by a bolt 280. The solenoid 278 is spaced inside the ring-shaped recessed portion 274 of the clutch body 258. When the solenoid 278 is excited, the ring body 266 is attracted to the clutch body 258 against the spring 268. As a result, the projected portion 272 of the ring body 266 engages with the recessed portion 270 of the clutch body 258. This transmits the rotation of the clutch body 258 to the ring body 266, thereby rotating the ring body 266.

Next, the rack and pinion mechanism 34 is described in detail.

A pinion 282 is provided between the bearing portions 204, 206 on the shaft 202. Corresponding to the pinion 282, a rack 284 is provided on the rear wheel steering shaft 30. The pinion 282 and the rack 284 engages with each other. Accordingly, the rotation of the shaft 202 causes the rear wheel steering shaft 30 to shift in the axial direction thereof, thereby steering the rear wheels.

Now, the gear mechanism 51 is described as follows.

Detection shafts 292, 292 for the two rear wheel steering angle sensors 120, 120 are connected to shafts 296, 296 by means of spline connecting rings 294, 294 which are made of, for example, resin. The shafts 296, 296 are pivotably supported by bearing portions 298, 300 respectively. Gears 302, 304 are fixed between the bearing portions 298, 300 on the shafts 296, 296. Meanwhile, a gear 306 is fixed on one end of the shaft 202. This gear 306 engages with the gears 302, 304.

Thus, when the rotation of the shaft 202 steers the rear wheels, the shafts 296, 296 are rotated by the gears 306, 302, 304. Then, the rear wheel steering angle sensors 120, 120 detect the rotation of the shaft 202.

With the above-mentioned arrangement, the rear wheel steering device 8 functions in the following manner.

In the case of an OFF state of the ignition switch or while the engine is being stopped, both clutch mechanisms 49, 50 are disengaged. In other words, the solenoid 254 is not excited in the clutch mechanism 49, and thus the ring body 240 is separated from the clutch body 242 by the spring 246. Similarly, the solenoid 278 is not excited in the clutch mechanism 50, and thus the ring body 266 is separated from the clutch body 258 by the spring 268. Since both clutch mechanisms 49, 50 are disengaged, the rear wheel steering shaft 30 is pressed and held in the neutral position by the centering spring 98 of the centering spring means 36.

In the case of an ON state of the ignition switch or while the engine is being driven, both clutch mechanisms 49, 50 are engaged. In other words, the solenoid 254 is excited in the clutch mechanism 49, and thus the ring body 240 is attracted to the clutch body 242 against the pressing force by the spring 246. As a result, the projected portion 248 of the ring body 240 engages with the recessed portion 250 of the clutch body 242. In this way, the rotation of the ring body 240 is transmitted to the clutch body 242, thereby rotating the clutch body 242. Similarly, the solenoid 278 is excited in the clutch mechanism 50, and thus the ring body 266 is attracted to the clutch body 258 against the pressing force by the spring 268. As a result, the projected portion 272 of the ring body 266 engages with the recessed portion 270 of the clutch body 258. In this way, the rotation of the clutch body 258 is transmitted to the ring body 266, thereby rotating the ring body 266.

When the servomotor 32 is driven while the two clutch mechanisms 49, 50 are being engaged, the rotation of the output shaft 220 of the servomotor 32 is transmitted to the rear wheel steering shaft 30 by means of the worm gearing mechanism 48 of the transmission mechanism 33, the clutch mechanisms 49, 50, and the rack and pinion mechanism 34. Consequently, the rear wheel steering shaft 30 is forced to shift from the neutral position against the pressing force by the centering spring 98 of the centering spring means 36. Thus, the rear wheels can be steered.

In detail, the rotation of the output shaft 220 of the servomotor 32 is transmitted to the worm wheel 214 by means of the spline connecting ring 222, the output shaft 224, the worm 230 of the output shaft 224. Since the first clutch mechanism 49 is in an engaged state, the rotation of the worm wheel 214 is transmitted to the shaft 200 by means of the ring body 236, the ring body 240 and the clutch body 242. Since the second clutch mechanism 50, too, is in an engaged state, the rotation of the shaft 200 is transmitted to the shaft 202 by means of the clutch body 258, the ring body 266 and the ring body 262. The rotation of the shaft 202 is then transmitted to the rear wheel steering shaft 30 by means of the pinion 282 and the rack 284. Accordingly, the rear wheel steering shaft 30 shifts in an axial direction thereof, thereby steering the rear wheels.

As shown in FIG. 1, the stopper member 301, the feature of the present invention, is provided in the worm gearing mechanism 48 interposed between the clutch mechanisms 49, 50 and the servomotor 32 in the transmission system of the transmission mechanism 33. This stopper member 301 restricts the rotation of the worm wheel 214 and thus prevents the rotation of the servomotor 32 exceeding a fixed angle. The stopper member 301 comprises: a convex portion 301a integrally formed on the worm wheel 214 to rotate therewith; and a pair of locking portions 301b, 301b provided on the housing 40 corresponding to the convex portion 301a. When the left and right rear wheels 6L, 6R are steered from the neutral position exceeding a fixed angle by the rotation of the servomotor 32 via the transmission mechanism 33, the convex portion 301a makes contact with and locked by either one of the locking portions 301b, 301b. A rotation limit range of the servomotor 32, which is defined by the stopper member 301, is set smaller than a stroke-displacement restriction range of the rear wheel steering shaft 30, which is defined by the restricting means 103. Accordingly, when the servomotor 32 rotates exceeding a fixed angle, the stopper member 301 prevents the rotation of the servomotor 32 before the restricting means 103 restricts the axial stroke displacement of the rear wheel steering shaft 30.

In the above-mentioned embodiment, the stopper member 301 provided in the worm gearing mechanism 48 of the transmission mechanism 33 restricts the rotation of the worm wheel 214 in the case when the servomotor 32 rotates exceeding a fixed angle or uncontrollably rotates. In this way, since the stopper member 301 effectively prevents the uncontrollable rotation of the servomotor 32, an abnormal steering operation of the rear wheels 6L, 6R is reliably prevented and thus running stability of the vehicle can be improved.

After the stopper member 301 prevented the uncontrollable rotation of the servomotor 32, both clutch mechanisms 49, 50 of the transmission mechanism 33 are disengaged in accordance with the control by the controller 38. Then, the rear wheel steering shaft 30 and the left and right rear wheels 6L, 6R connected therewith are brought back to the neutral position and are held there by the pressing force of the centering spring means 36.

While the uncontrollable rotation of the servomotor 32 is being stopped by the stopper member 301, the clutch mechanism 49, 50 are not subject to any load, since the clutch mechanisms 49, 50 are located on a downstream side of the stopper member 301 in the power transmission system of the transmission mechanism 33. Accordingly, the clutch mechanisms 49, 50 can be disengaged without any trouble.

In the above embodiment, as a preventive measure against an uncontrollable rotation of the servomotor 32 and further an abnormal rear wheel steering operation, the stopper member 301 prevents an excessive rotation of the servomotor exceeding a fixed level. Apart from this, as an additional preventive measure in this embodiment, the restricting means 103 restricts a stroke displacement of the rear wheel steering shaft 30 exceeding a fixed level. In this way, double safety measures are taken to prevent an abnormal steering operation of the rear wheels 6L, 6R, thereby further improving safety of the vehicle.

The servomotor 32 is disposed in the widthwise direction of the vehicle body to be parallel to the rear wheel steering shaft 30 in an adjacent position thereto. Furthermore, the transmission mechanism 33, the rear wheel steering shaft 30 and the centering spring means 36 are accommodated in a single housing 40. These arrangement makes possible a compact rear wheel steering device.

What is claimed is:

1. A rear wheel steering device for a vehicle including: a rear wheel steering shaft for interconnecting left and right rear wheels; an electric motor; a transmission mechanism for transmitting an output from said electric motor to said rear wheel steering shaft; and said transmission mechanism having a rotatable element engaged with an output shaft of said electric motor, and a clutch to interrupt an output transmission from said electric motor to said rear wheel steering shaft wherein, a stopper member is disposed to restrict a relative rotation of said rotatable element, thereby preventing an excessive rotation of said electric motor exceeding a fixed level.

2. A rear wheel steering device for a vehicle as defined in claim 1 further comprising restricting means provided on an outer periphery of said rear wheel steering shaft for restricting a stroke-displacement of said rear wheel steering shaft in an axial direction thereof exceeding a fixed level.

3. A rear wheel steering device for a vehicle as defined in claim 2 wherein a rotation limit range of said electric motor, which is defined by said stopper member, is set smaller than a stroke displacement restriction range of said rear wheel steering shaft, which is defined by said restricting means.

4. A rear wheel steering device for a vehicle as defined in claim 2 wherein said restricting means comprises a pair of left and right stoppers provided on said rear wheel steering shaft to be spaced apart from each other at a fixed interval and a pair of locking portions provided in a housing which accommodates said rear wheel steering shaft, and wherein a centering spring is disposed between said left and right stoppers to press said rear wheel steering shaft into a neutral position.

5. A rear wheel steering device for a vehicle as defined in claim 1 wherein said rear wheels are steered in accordance with a vehicle speed in such a way that, at low speeds, said rear wheels are steered in a phase of an opposite direction to a steered direction of front wheels, and at high speeds, said rear wheels are steered in a phase of the same direction as a steered direction of said front wheels.

6. A rear wheel steering device for a vehicle as defined in claim 1 wherein said electric motor is disposed in the widthwise direction of the vehicle body to be parallel to said rear wheel steering shaft, said transmission mechanism includes a shaft disposed in the longitudinal direction of the vehicle body so as to receive power from said electric motor by means of a worm gearing mechanism, said shaft is drivingly connected with said rear wheel steering shaft by means of a rack and pinion mechanism, and said clutch is disposed on an outer periphery of said shaft.

7. A rear wheel steering device for a vehicle as defined in claim 6 wherein said stopper member includes a convex portion provided on a worm wheel of said worm gearing mechanism, and a locking portion provided in a housing which accommodates said transmission mechanism, and wherein said locking portion restricts a rotation of said worm wheel by means of said convex portion, thereby preventing a rotation of said electric motor exceeding a fixed level.

8. A rear wheel steering device for a vehicle as defined in claim 7 wherein said transmission mechanism, said rear wheel steering shaft and a centering spring for pressing said rear wheel steering shaft into a neutral position are accommodated in a single same housing.

* * * * *